A. IZEN.
RESILIENT WHEEL.
APPLICATION FILED SEPT. 12, 1918.
1,318,496.
Patented Oct. 14, 1919.
2 SHEETS—SHEET 2.
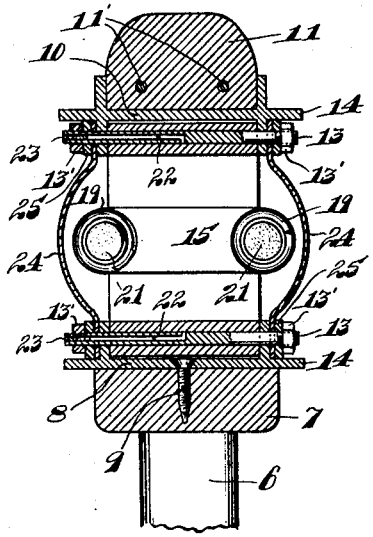
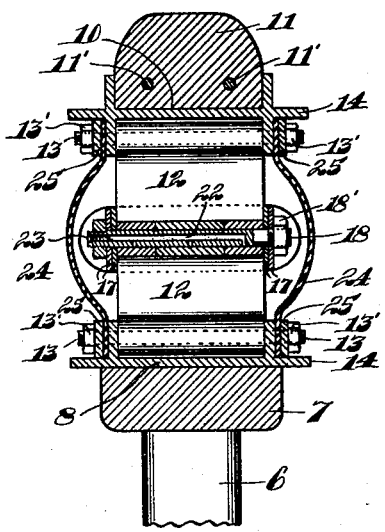
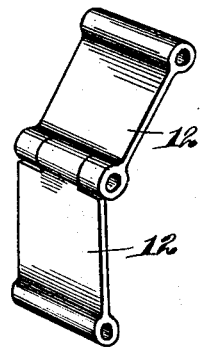
Witnesses:
C. E. Wessels.
Inventor:
Alexander Izen,
By Joshua R. H. Potts
his Attorney.

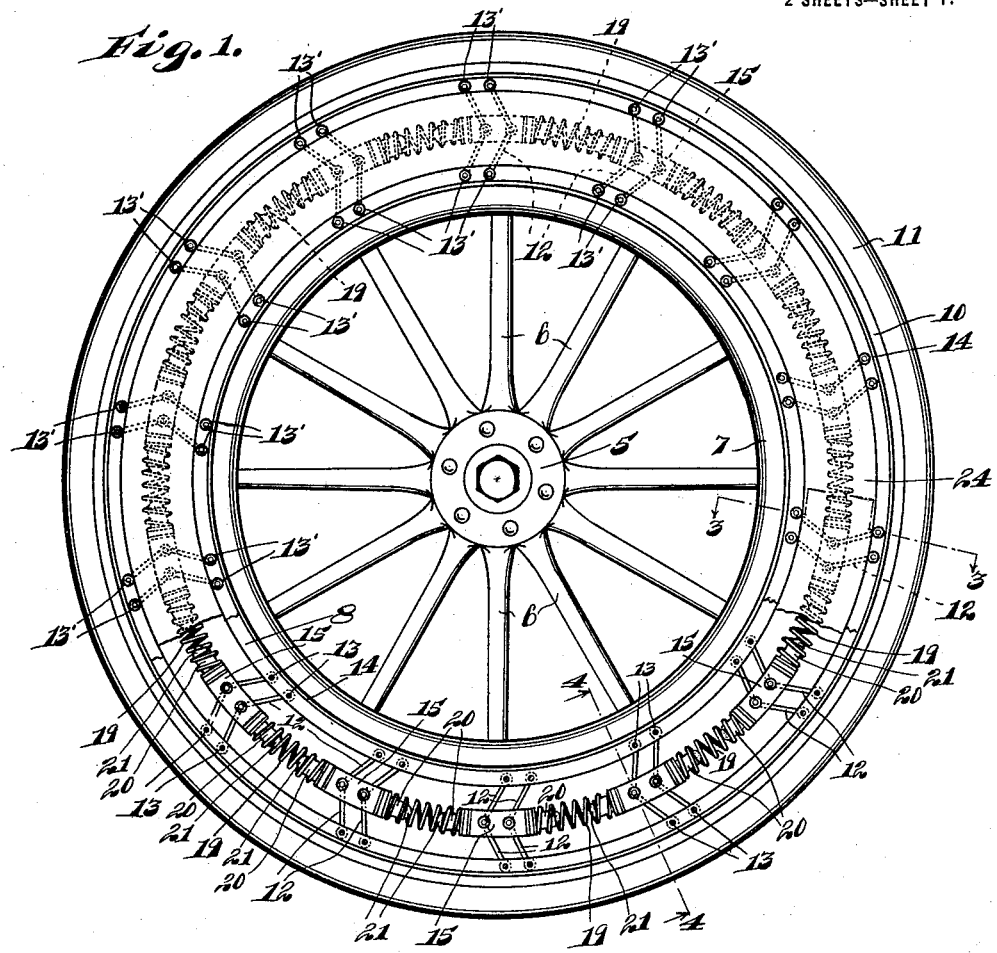
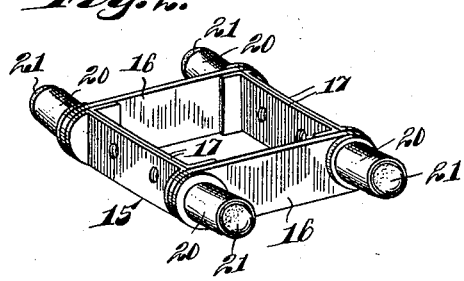

UNITED STATES PATENT OFFICE.

ALEXANDER IZEN, OF DETROIT, MICHIGAN.

RESILIENT WHEEL.

1,318,496.           Specification of Letters Patent.       Patented Oct. 14, 1919.

Application filed September 12, 1918. Serial No. 253,676.

*To all whom it may concern:*

Be it known that I, ALEXANDER IZEN, a former subject of the Czar of Russia, who has declared his intention of becoming a citizen of the United States, and who is a resident of the city of Detroit, Wayne county, Michigan, have invented certain new and useful Improvements in Resilient Wheels, of which the following is a specification.

My invention relates to improvements in resilient wheels, and has for its object the production of a wheel of this character which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which:

Figure 1, is a side elevation of a resilient wheel embodying the invention, portions thereof being broken away to expose underlying parts, Fig. 2, a perspective view of one of the spring-seat parts employed in the construction, Figs. 3 and 4, enlarged sections taken on lines 3—3 and 4—4, respectively of Fig. 1, and Fig. 5, a perspective view of one of the toggle members employed in the construction.

The preferred form of construction, as illustrated in the drawings, comprises a wheel consisting of a hub 5 from which extend radial spokes 6. The outer ends of spokes 6 are rigidly connected by a rim member 7, upon the periphery of which is arranged an annular metallic channel member 8 secured thereto by screws 9.

Surrounding the member 8 is an annular rim member 10 of such diameter as to result in the formation of an annular space between said parts. The member 10 is formed with external and internal channels, as shown, a tire 11, preferably of solid rubber or other suitable material, being mounted in the external channel and secured in position therein by cables or wires 11'. Arranged in the annular space between the members 8 and 10 is a plurality of toggles 12, the respective ends of which are positioned in the channels at the adjacent sides of said members and pivotally secured thereto by means of bolts 13 and coöperating nuts 13'. In order to protect the ends of said bolts, annular laterally projecting flanges 14 are formed upon the parts 8 and 10, as clearly shown in Figs. 3 and 4, the outer edges of said flanges projecting beyond the ends of said bolts and thus serving as a means of protection for the same.

The toggles 12 are arranged in pairs, and coöperating with each pair of toggles is a rectangular frame 15 consisting of spaced parallel end members 16 which are connected at their ends by side members 17, there being preferably two members 17 at each side, the ends of which are secured by electrical welding to the members 16. Each frame 15 is pivotally connected with the knee joints of the toggles coöperating therewith by bolts 18 and coöperating nuts 18', said bolts constituting the pintles of the knee joints, as will be readily understood.

The frames 15 are curved to conform with the curvature of the wheel rim, and the same are arranged concentrically with the rim parts, the employment of two toggles coöperating with each frame serving of course to hold the same in proper relative position between the adjacent sides of the rim parts.

Interposed between the adjacent ends of adjacent members 15 are helical springs 19, the ends of which securely embrace socket forming members 20 which project from the ends of each member 15. In the socket members 20 are arranged bumpers or cushion members 21 of rubber or other suitable cushioning material, the arrangement being such that in the event of breakage or disabling of the springs 19, said members 21 of the adjacent frames 15 will come in contact with each other and thus assume the burden of the disabled springs. The socket members 20 are positioned in alinement with the side bars 17 of each frame 15 so that any pressure exerted thereon will be borne by the bars 17 and not by the end members 16.

In order to effect lubrication of the pivotal joints between the toggle and the rim parts, and between the members or leaves of each toggle, each of the bolts 13 and 18 is formed with an axial oil passage 22, the inner end of which communicates with the bearing, the outer end thereof opening exteriorly and being provided with a removable screw plug 23 through which the oil may be injected, as will be readily understood.

With the construction set forth, it will be seen that in use, any weight or load upon the wheel will be transmitted to the toggles 12 and the springs 19 coöperating therewith, and thus said springs will serve to absorb any shocks or jars to which the wheel is subjected, filling the same function as the air in a pneumatic tire. In case of excessive shocks or jars, or in case of disabling of the springs 19, the cushion members 21 will be brought into play. The arrangement is such also that where the wheel is used for driving, considerable power will be saved through the action of the springs and toggles.

In order to close the annular space between the parts 8 and 10, so as to exclude dust and foreign matter therefrom, sheets 24 of suitable elastic material are fastened to the sides of members 8 and 10 spanning the sides of said annular space, said members 24 being secured in position by bands 25 held in position by nuts 13'.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

A resilient wheel comprising a rim consisting of two concentric parts having an intervening annular space between them; a plurality of spaced toggles arranged in said space and having their ends pivotally connected with said rim parts, said toggles being arranged in pairs; a frame carried by and connected with each pair of said toggles at the knee joints thereof; and springs interposed between and connecting the adjacent ends of adjacent frames, substantially as described.

In testimony whereof I have signed my name to this specification in the presence of two subscribing witnesses.

ALEXANDER IZEN.

Witnesses:
JOSHUA R. H. POTTS,
HELEN S. LILLIS.

Copies of this patent may be obtained for five cents each, by addressing the "Commissioner of Patents, Washington, D. C."